W. C. LACY.
WHEEL.
APPLICATION FILED JAN. 18, 1921.

1,412,359. Patented Apr. 11, 1922.

Inventor.
William C. Lacy.
By Hazard & Miller
Attorneys.

UNITED STATES PATENT OFFICE.

WILLIAM C. LACY, OF YUMA, ARIZONA.

WHEEL.

1,412,359.  Specification of Letters Patent.  Patented Apr. 11, 1922.

Application filed January 18, 1921. Serial No. 438,205.

*To all whom it may concern:*

Be it known that I, WILLIAM C. LACY, a citizen of the United States, residing at Yuma, in the county of Yuma and State of Arizona, have invented new and useful Improvements in Wheels, of which the following is a specification.

It is the object of this invention to provide a wheel for tractors or the like, which provides increased traction surface with the ground, and also eliminates the tendency of the wheel to spin in sandy or soft ground.

More specifically the invention contemplates the provision of an arrangement, whereby pivotally mounted arms extend beyond the wheel proper, and are provided with contacts used for engaging the ground, the arms being so supported that they will be successively moved into such position as to cause their contact shoes to impinge flatly against the surface of the ground for providing a maximum tread surface.

The invention will be readily understood from the following description of the accompanying drawings, in which.

Figure 1:
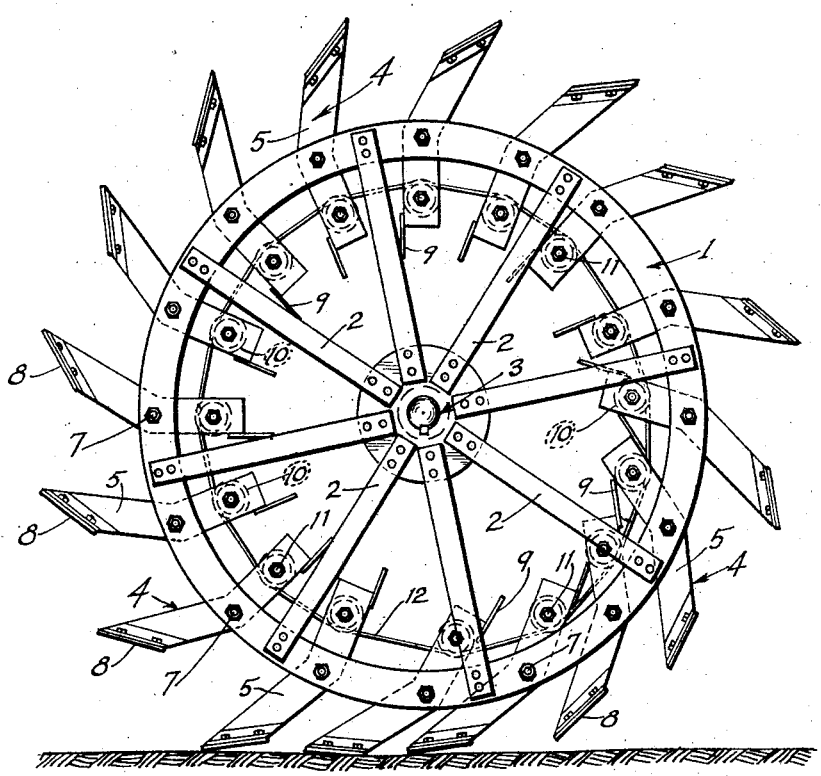
Figure 1 is a side elevation of a wheel constructed in accordance with the invention.
Figure 2:
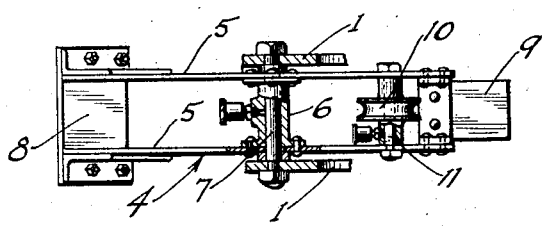
Fig. 2 is an edge view of one of the contact arms of the wheel shown partly in longitudinal section.

The wheel consists of side plates 1, which may be either solid discs, or annular rings provided with spokes 2, as shown in the form of the invention illustrated in the drawings. A usual hub 3 is provided at the center of the wheel for mounting the same.

A plurality of contact arms 4 are pivoted intermediate of their lengths to side plates 1, so that one end of a contact arm projects beyond side plates 1, while its opposite arm extends inwardly between the same. The contact arm consists of side plates 5 having a bearing 6 fixed between the same approximately mid-way of its length with a bolt 7 extending through said bearing, and received through the respective side plates 1 of the wheel for pivotally mounting the contact arm.

Figure 3:
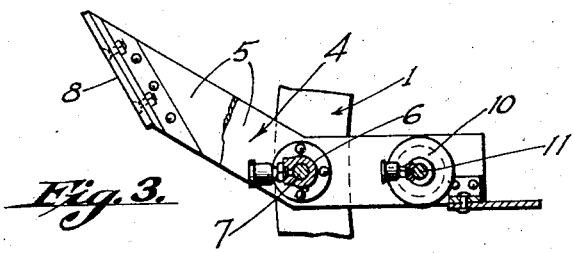
Fig. 3 is a side elevation of the arm partly broken away.

The outer end of the contact arm is provided with a ground engaging shoe 8, and the inwardly extending end of the contact arm is preferably angularly disposed with relation to the projecting end of the arm as clearly shown in Fig. 3, and terminates in a longitudinally extending contact plate 9.

A pulley 10 is journaled upon a bolt 11 between the side plates of the contact arm, and is arranged between the pivotal mounting for said contact arm and the contact plate 9 at its inner end. A flexible member 12 shown as a cable, forms an annular member extending around the wheel and engaging pulleys 10 of the respective contact arms, so as to limit the outward swing of the inner end of a contact arm.

The parts are so arranged that the contact arms will normally extend with their projecting ends inclined forwardly as clearly shown in Fig. 1, and as the contact shoe 8 of each contact arm comes adjacent the surface of the ground, the wheel will be turned, so that the ground engaging shoe of the arm is flat with the surface of the ground, so as to obtain a maximum traction surface.

As the weight of the wheel rests upon any particular contact arm, there will be a tendency of the wheel to rotate upon the pivot bolt 7 of said contact arm, and it is by this arrangement that the ground engaging shoe of the succeeding contact arm is brought into position parallel to the ground. It will be noted that when the weight of a wheel is upon a contact arm that the tendency of its outer end to swing inwardly, and its inner end to swing outwardly is limited by the engagement of pulley 10 carried by the arm with the flexible member 12.

When the wheel is operated in the reverse direction, it will be noted that the ground engaging shoes of the respective contact arms will be turned parallel to the surface of the ground through the proper positioning of the contact plates 9 of the respective contact arms against next adjacent contact arms as clearly shown in Fig. 1.

It will be understood that if desired, the ground engaging shoes 8 may be shod with rubber or the like when moving upon paved roads, and that the exemplification of the invention as thus described, is capable of various mechanical changes and modifications, which I have not attempted to set forth in detail, since they do not alter the principles of construction embodied in my invention.

What is claimed is:

1. The combination with a wheel of contact arms comprising a normally radially disposed upper straight portion and a straight lower portion angularly disposed from said upper portion, said arm being pivoted substantially at the junction of the two portions; ground engaging elements carried by the outer ends of said arms, pulleys carried by the inner ends of said arms, and a flexible annulus engaging said pulleys for positioning said ground engaging elements parallel to the ground.

2. The combination with a wheel of pivoted contact arms comprising a normally radially disposed upper straight portion and a straight lower portion angularly disposed from said upper portion, ground engaging elements carried by the outer ends of said arms, pulleys carried by the inner ends of said arms, and a flexible annulus engaging said pulleys for positioning said ground engaging elements parallel to the ground.

3. The combination with a wheel of contact arms pivoted thereon and carrying ground engaging elements, pulleys at the inner ends of said arms, and a flexible annulus engaging said pulleys for positioning said ground engaging elements parallel to the ground.

4. The combination with a wheel of pivoted contact arms comprising a normally radially disposed upper straight portion and a straight lower portion angularly disposed from said upper portion, ground engaging elements carried by the outer ends of said arms, pulleys carried by the inner ends of said arms, and a flexible annulus engaging said pulleys for positioning said ground engaging elements parallel to the ground, contact elements at the inner ends of said arms engaging one of the radial sides of the adjacent arms so as to limit the swing of said arms.

In testimony whereof I have signed my name to this specification.

WILLIAM C. LACY.